Patented June 26, 1928.

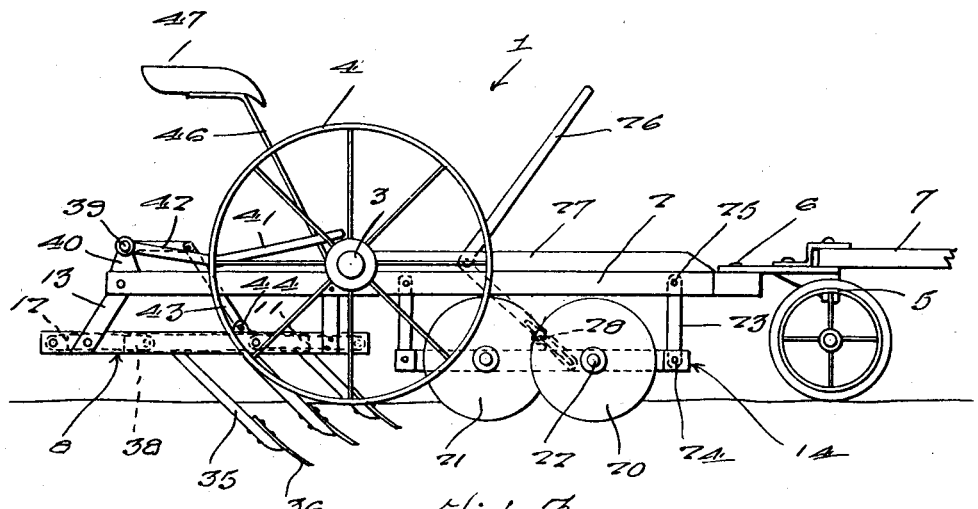

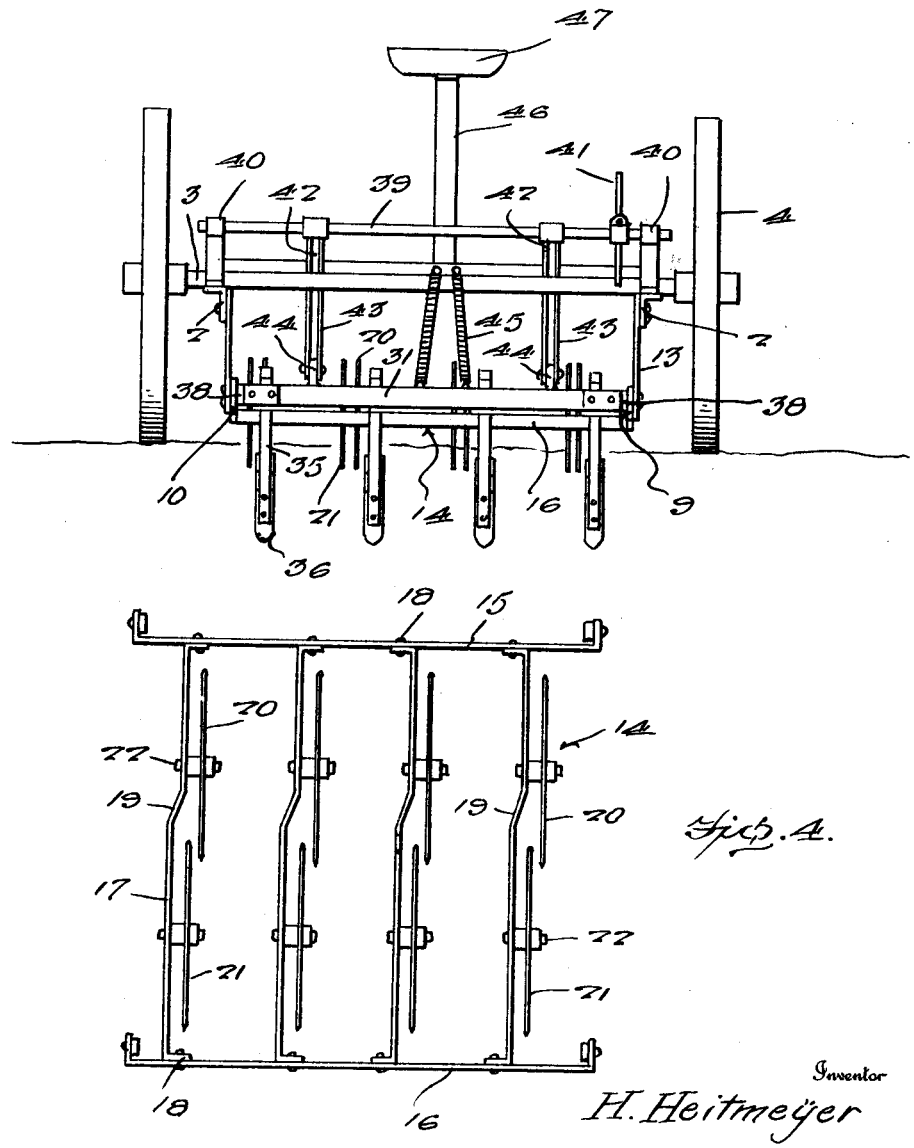

1,674,779

UNITED STATES PATENT OFFICE.

HERMAN HEITMEYER, OF SHELDON, IOWA.

MEADOW CULTIVATOR.

Application filed June 2, 1925. Serial No. 34,427.

This invention relates to improvements in cultivators and is more particularly adapted for use in cultivating the soil in meadows, to stimulate the growth of grass or vegetation therein.

One of the important objects of the present invention is to provide a cultivator which includes a frame supporting spaced coulters which are adapted to cut grooves in the soil, an additional frame being supported in the rear of the aforementioned frame, and carrying a plurality of stubbles which are adapted to uplift the soil and spread the same equally to both sides without digging up the soil.

A further object of the invention is to provide a meadow cultivator of the above mentioned character, wherein the coulter supporting frame and the shovel supporting frame are independently pivotally supported on the main frame of the cultivator, whereby either or both of the ground engaging implements may be raised to an inoperative position, when the cultivator is not in use.

A further object is to provide a cultivator of the above mentioned character, wherein the coulter carrying frame, as well as the shovel carrying frame are supported on the main wheeled frame.

A still further object is to provide a cultivator of the above mentioned character, which is simple in construction, inexpensive, strong and durable, and further well adapted for the purpose for which it is designated.

Other objects and advantages of the invention will become apparent during the course of the following detailed description.

In the accompanying drawings, forming a part of this application, and in which like reference characters indicate corresponding parts throughout the several views:

Figure 1 is a side elevation of the meadow cultivator embodying my invention, showing the coulters and the shovels in an operative position.

Figure 2 is a rear end elevation.

Figure 3 is a top plan view of the shovel carrying frame, showing the manner in which the shovels are associated with the frame, and Figure 4 is a similar view of the coulter carrying frame, with the coulters attached thereto.

In the drawings, wherein for the purpose of illustration is shown the preferred embodiment of my invention, the numeral 1 designates generally my improved metal cultivator, the same comprising the main frame 2, on which is supported the axle 3, the same being preferably located adjacent the rear end of the frame. The usual ground engaging wheels 4 are mounted on the respective ends of the axle. A truck designated generally by the numeral 5 is swivelly connected to the forward end of the frame as at 6, and the wheeled truck 5 carries the draft pole 7, for the purposes well known in the art.

An auxiliary frame is suspended from the rear portion of the main frame and is designated generally by the numeral 8, the same comprising a pair of spaced side bars 9 and 10 respectively, which are secured together through the medium of the front and rear cross bars 11 and 12 respectively. These side bars of the auxiliary frame are supported below the sides of the main frame, through the medium of the securing bracket 13. The purpose of this auxiliary frame 8 will hereinafter be more fully described.

The coulter supporting frame is designated generally by the numeral 14, and the same comprises the front and rear transversely extending spaced bars 15 and 16 respectively. Extending between the front and rear bars are the spaced strap iron members 17, the respective ends thereof being bent and secured to the front and rear transverse bars as illustrated at 18. The intermediate portion of each of the strap iron members 17 is offset, as indicated at 17, and the purpose thereof will be presently apparent. A pair of coulter wheels 20 and 21 are supported on each of the strap iron members 17 on one side thereof, and as is illustrated more clearly in Figure 4, the coulter wheels 20 are mounted on the forward portions of the strap iron members, while the coulters 21 are supported adjacent the rear cross bar 16, so that the pair of coulters on each of the strap irons are arranged in staggered relation. The mounting for each of the coulter wheels is illustrated generally as at 22.

The coulter frame 14 is suspended pivotally from the forward portion of the main frame 2, through the medium of the links 23, four of such links being provided at the respective ends of the front and rear transverse bars of the coulter frame, the links being pivotally secured to the forwardly bent ends of the transverse members as indicated at 24. The upper ends of the links are pivotally secured to the respective sides of the main frame as at 25.

The pivoted coulter frame 14 is adapted to be raised and lowered with respect to the main frame, through the medium of the lever 26, which is pivotally supported on the longitudinally extending bar 27, the latter being supported on the top of the central portion of the main frame 2. The lower end of the lever is connected to the frame 14, as illustrated at 28, and it is obvious that when the lever 26 is swung rearwardly on its pivot, the frame 14 will swing forwardly and upwardly, thereby raising the coulter wheels 20 and 21 out of engagement with the ground, to an inoperative position. It is of course understood that the lever 26 is connected at its lower end to the frame 14 in such a manner that it permits the vertical movement of the coulter carrying frame when the upper end of the lever is actuated.

The shovel carrying frame which forms a part of the present invention is indicated generally at 29 and the same includes front and rear transversely disposed channel bars 30 and 31, between which extend the spaced shovel supporting channel bars 32. Suitable bracing means, such as is shown at 33, is associated with the channel bar 32 and the front transversely extending channel bar 30. Each of the longitudinally extending channel bars 32 is provided with spaced notches 34 for receiving the upper ends of the shanks 35, on the lower ends of which are secured the ground engaging shovels 36. The shovels have their shank portions secured in any desired vertically adjusted position in the respective notches 34 of the several channel bars 32, through the medium of the securing means 37. As is illustrated more clearly in Figure 1 of the drawings, the shovel members increase in length gradually toward the rear of the frame 29 so that the depth at which the shovels travel in the earth will increase gradually toward the rear of the cultivator.

The shovel carrying frame 29 is pivotally supported in the auxiliary frame 8, through the medium of the links 38. These links are pivotally secured at one end to the outer faces of the sides 9 and 10 of the stationary auxiliary frame 8, and the other ends of the links are pivotally secured to the adjacent sides of the shovel carrying frames 29. The means for raising the shovel carrying frame 49 includes a shaft 39, which extends transversely across the rear end of the main frame 2, the ends of the shaft being journaled in suitable bearings 40. An actuating lever 41 is secured at one end to the shaft, for rotating the same. The connection between the shaft 39 and the shovel carrying frame, includes a pair of links 42, which are rigidly secured to the shaft at their rear ends, the forward ends of said links being pivotally connected to the upper ends of the links 43 and the latter are pivotally secured at their lower ends to the shovel carrying frame as at 44. Suitable coil springs 45 are connected to the forward end of the shovel carrying frame 29 and to the main frame, so as to assist in supporting the forward end of the shovel carrying frame in its proper horizontal position. A seat support 46 extends upwardly from the rear portion of the frame 2 and carries at its upper end the seat 47, which is adapted to be occupied by the operator of the cultivator.

The operation of my improved metal cultivator may be briefly stated as follows:

With the parts arranged as shown in Figure 1 of the drawings, wherein the coulter frame and the shovel carrying frame are disposed in their lower operative positions, the coulter wheels 20 and 21 will cut or form grooves in the top of the soil, it being understood that the coulter can be set so as to regulate the depth of the grooves, which are formed by the coulter wheels. The shovels 36 which are disposed in the rear of the coulter wheels will uplift the dirt and spread the same equally to both sides and as heretofore set forth, the shovels are arranged in such a manner as to cause the depth to gradually increase toward the rear of the frame so that the soil will not be torn up by the digging of the shovels into the ground. By arranging the coulter wheels in the manner heretofore described, the same will provide pairs of co-acting coulters which will cut a strip between each pair of coulters, and the shovels are arranged to be disposed in line between each pair of coulters so that the shovels will uplift the narrow strips.

Either the coulter frame or the shovel supporting frame may be raised to an inoperative position by actuating the respective levers, or if desired, both of the pivoted frames may be swung to a raised inoperative position for actuating both of the levers, so that the coulters and the shovels will not engage the ground.

A cultivator of the above mentioned character, is particularly adapted for use in cultivating the soil, in meadows for keeping the soil loose and mellow, thus stimulating the growth of the young grass roots or any other vegetation that may be planted in the soil.

While I have shown the preferred embodiment of my invention, it is to be understood that various changes in the size, shape and arrangement of parts may be resorted to, without departing from the spirit of the invention or the scope of the appended claim.

I claim:

A wheeled cultivator comprising a main frame, a coulter carrying frame carried by the main frame and including forward and rear transverse strap iron bars, the ends of each bar being bent laterally, spaced longitudinal members secured at their respective ends to the front and rear bars, the intermediate portion of each of said longitudinally extending members being offset, a pair of coulter wheels supported on each of the longitudinally extending members on opposide sides of the offset intermediate portion, links for suspending the coulter carrying frame from the main frame, said links being pivotally secured at their upper ends to the sides of the main frame and at their lower ends to the respective laterally disposed ends of the front and rear transverse strap iron bars of the coulter carrying frame, an angular lever pivoted on the main frame, and a pin and slot connection between said lever and the coulter carrying frame whereby said coulter carrying frame may be raised when the lever is actuated.

In testimony whereof I affix my signature.

HERMAN HEITMEYER.